United States Patent
Dai et al.

(10) Patent No.: US 9,337,743 B2
(45) Date of Patent: May 10, 2016

(54) APPARATUS AND METHOD FOR MULTIPLE PRIMARY BRIDGE RESONANT CONVERTERS

(71) Applicant: FutureWei Technologies, Inc., Plano, TX (US)

(72) Inventors: Heping Dai, Plano, TX (US); Daoshen Chen, Allen, TX (US); Dianbo Fu, Plano, TX (US)

(73) Assignee: Futurewei Technologies, Inc., Plano, TX (US)

( * ) Notice: Subject to any disclaimer, the term of this patent is extended or adjusted under 35 U.S.C. 154(b) by 259 days.

(21) Appl. No.: 14/052,583

(22) Filed: Oct. 11, 2013

(65) Prior Publication Data

US 2015/0103561 A1 Apr. 16, 2015

(51) Int. Cl.
*H02M 3/335* (2006.01)
*H02M 3/28* (2006.01)
*H02M 1/00* (2006.01)

(52) U.S. Cl.
CPC ............ *H02M 3/3353* (2013.01); *H02M 3/285* (2013.01); *H02M 3/33553* (2013.01); *H02M 3/33576* (2013.01); *H02M 2001/0058* (2013.01)

(58) Field of Classification Search
CPC .................................................. H02M 3/33546
See application file for complete search history.

(56) References Cited

U.S. PATENT DOCUMENTS

| | | | | |
|---|---|---|---|---|
| 7,518,886 B1 * | 4/2009 | Lai | ............................ | H02P 8/12 363/17 |
| 8,149,599 B2 * | 4/2012 | Coccia | .............. | H02M 3/33507 363/21.02 |
| 8,842,448 B2 * | 9/2014 | Ye | ...................... | H02M 3/33569 363/21.02 |
| 8,929,109 B2 * | 1/2015 | Chang | ................. | H02M 3/3376 323/267 |
| 2008/0298093 A1 * | 12/2008 | Jin | ........................ | H02M 3/285 363/21.06 |
| 2012/0275197 A1 * | 11/2012 | Yan | .................... | H02M 3/33592 363/21.02 |
| 2012/0320648 A1 * | 12/2012 | Harrison | ............. | H02M 1/4258 363/126 |

FOREIGN PATENT DOCUMENTS

| | | |
|---|---|---|
| CN | 101841244 A | 9/2010 |
| CN | 102790533 A | 11/2012 |
| CN | 202759382 U | 2/2013 |
| CN | 203466729 U | 3/2014 |
| KR | 20120044219 A | 5/2012 |
| WO | 2008029343 A2 | 3/2008 |

OTHER PUBLICATIONS

Feng et al., "Optimal Trajectory Control of LLC Resonant Converters for Soft Start-Up," IEEE Transactions on Power Electronics, vol. 29, No. 3, Mar. 2014, 8 pages.

(Continued)

*Primary Examiner* — Emily P Pham

(74) *Attorney, Agent, or Firm* — Slater Matsil, LLP

(57) ABSTRACT

A converter comprises an input stage coupled to a power source, wherein the input stage comprises a plurality of power switches, a first resonant tank coupled to the input stage, wherein the first resonant tank is of a first Q value, a second resonant tank coupled to the input stage, wherein the second resonant tank is of a second Q value, a transformer coupled to the input stage through the first resonant tank and the second resonant tank and an output stage coupled to the transformer.

20 Claims, 6 Drawing Sheets

(56) References Cited

OTHER PUBLICATIONS

Hu et al., "An Interleaving and Load Sharing Method for Multiphase LLC Converters," Department of Electrical and Computer Engineering, Queen's University, 2013, 8 pages.

International Search Report of Patent Cooperation Treaty (PCT), International Application No. PCT/US2014/087911, Applicant Huawei Technologies Co., Ltd., date of mailing Sep. 30, 2014, 13 pages.

* cited by examiner

APPARATUS AND METHOD FOR MULTIPLE PRIMARY BRIDGE RESONANT CONVERTERS

TECHNICAL FIELD

The present invention relates to a resonant converter, and, in particular embodiments, to dual primary bridge resonant converters.

BACKGROUND

A telecommunication network power system usually includes an AC-DC stage converting the power from the AC utility line to a 48V DC distribution bus and a DC-DC stage converting the 48V DC distribution bus to a plurality of voltage levels for all types of telecommunication loads. Both stages may comprise isolated DC-DC converters. Isolated DC-DC converters can be implemented by using different power topologies, such as flyback converters, forward converters, half bridge converters, full bridge converters, inductor-inductor-capacitor (LLC) resonant converters and the like.

As technologies further advance, bus converters have been widely employed in the telecommunication industry. The bus voltages may be divided into three categories, a 12V bus voltage converted from a 48V input dc power supply, a 48V bus voltage converted from a 380V input dc power supply and a 12V bus voltage converted from a 380V input dc power supply. A bus converter not only converts the input voltage from a higher level to a lower level, but also provides isolation through a magnetic device such as transformers and/or the like.

The intermediate bus voltage such as 12V may function as an input power bus for a plurality of downstream non-isolated power converters. The downstream non-isolated power converters may be implemented as step-down dc/dc converters such as buck converters, step-up dc/dc converters such as boost converters, linear regulators, any combinations thereof and/or the like. The downstream non-isolated power converters operate under a tight control loop so that fully regulated output voltages are fed into their respective loads.

As power consumption has become more important, there may be a need for high power density and high efficiency bus converters. LLC resonant converters have become the preferred choice for achieving high performance (e.g., high power density and high efficiency) because LLC resonant converters are capable of reducing switching losses through zero voltage switching and/or zero current switching.

SUMMARY OF THE INVENTION

These and other problems are generally solved or circumvented, and technical advantages are generally achieved, by preferred embodiments of the present invention which improve the efficiency of an inductor-inductor-capacitor (LLC) resonant power converter and limit the inrush current during a startup process of the LLC resonant power converter.

In accordance with an embodiment, a converter comprises an input stage coupled to a power source, wherein the input stage comprises a plurality of power switches, a first resonant tank coupled to the input stage, wherein the first resonant tank is of a first Q value, a second resonant tank coupled to the input stage, wherein the second resonant tank is of a second Q value, a transformer coupled to the input stage through the first resonant tank and the second resonant tank and an output stage coupled to the transformer.

In accordance with another embodiment, a method comprises providing a resonant converter, wherein the resonant converter comprises an input stage coupled to a power source, wherein the input stage comprises a plurality of power switches, a first resonant tank coupled to a first portion of the plurality of power switches, wherein the first resonant tank is of a first Q value, a second resonant tank coupled to a second portion of the plurality of power switches, wherein the second resonant tank is of a second Q value, a transformer coupled to the first resonant tank and the second resonant tank and an output stage coupled to the transformer.

The method further comprises enabling the first portion of the plurality of power switches and disabling the second portion of the plurality of power switches during a startup process of the resonant converter and enabling the second portion of the plurality of power switches after an output voltage of the resonant converter is greater than a first predetermined threshold and a load current of the resonant converter is greater than a second predetermined threshold.

In accordance with yet another embodiment, a method comprises providing a dual primary bridge resonant converter, wherein the dual primary bridge resonant converter comprises a first full bridge switching network and a first resonant tank coupled to the first full bridge switching network, wherein the first resonant tank is of a first Q value, a second full bridge switching network, wherein the second full bridge switching network and the first full bridge switching network are connected in parallel and a second resonant tank coupled to the second full bridge switching network, wherein the second resonant tank is of a second Q value, a transformer coupled to the first resonant tank and the second resonant tank and an output stage coupled to the transformer.

The method further comprises enabling the first full bridge switching network and disabling the second full bridge switching network during a startup process of the dual primary bridge resonant converter.

An advantage of a preferred embodiment of the present invention is improving a power converter's efficiency and limiting the inrush current of the power converter through transitions between different operating modes of the power converter.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures or processes for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the present invention, and the advantages thereof, reference is now made to the following descriptions taken in conjunction with the accompanying drawings, in which.

Corresponding numerals and symbols in the different figures generally refer to corresponding parts unless otherwise indicated. The figures are drawn to clearly illustrate the relevant aspects of the various embodiments and are not necessarily drawn to scale.

DETAILED DESCRIPTION OF ILLUSTRATIVE EMBODIMENTS

The making and using of the presently preferred embodiments are discussed in detail below. It should be appreciated, however, that the present invention provides many applicable inventive concepts that can be embodied in a wide variety of specific contexts. The specific embodiments discussed are merely illustrative of specific ways to make and use the invention, and do not limit the scope of the invention.

The present invention will be described with respect to preferred embodiments in a specific context, namely a dual primary bridge inductor-inductor-capacitor (LLC) resonant converter. The invention may also be applied, however, to a variety of resonant converters. Hereinafter, various embodiments will be explained in detail with reference to the accompanying drawings.

Figure 1:
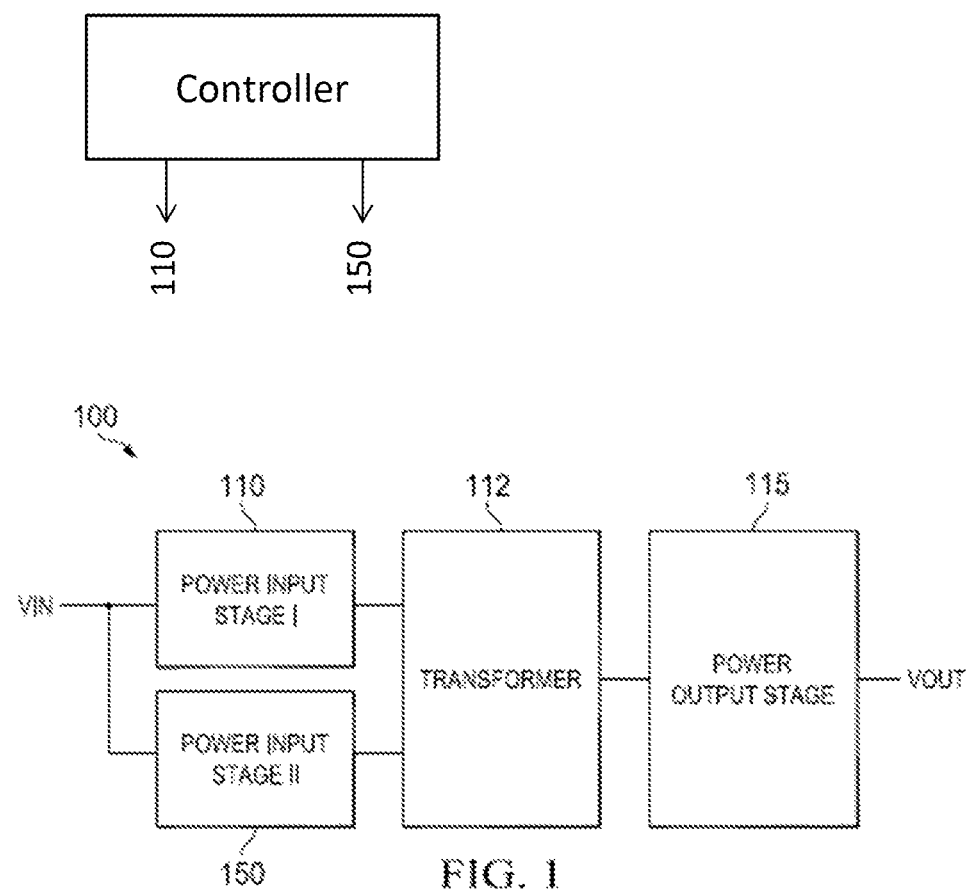
FIG. 1 illustrates a block diagram of a power converter in accordance with various embodiments of the present disclosure.

FIG. 1 illustrates a block diagram of a power converter in accordance with various embodiments of the present disclosure. The power converter 100 may include a first power input stage 110, a second power input stage 150, a transformer 112 and a power output stage 115. As shown in FIG. 1, the first power input stage 110 and the second power input stage 150 are connected in parallel between a power source VIN and the transformer 112.

Figure 2:
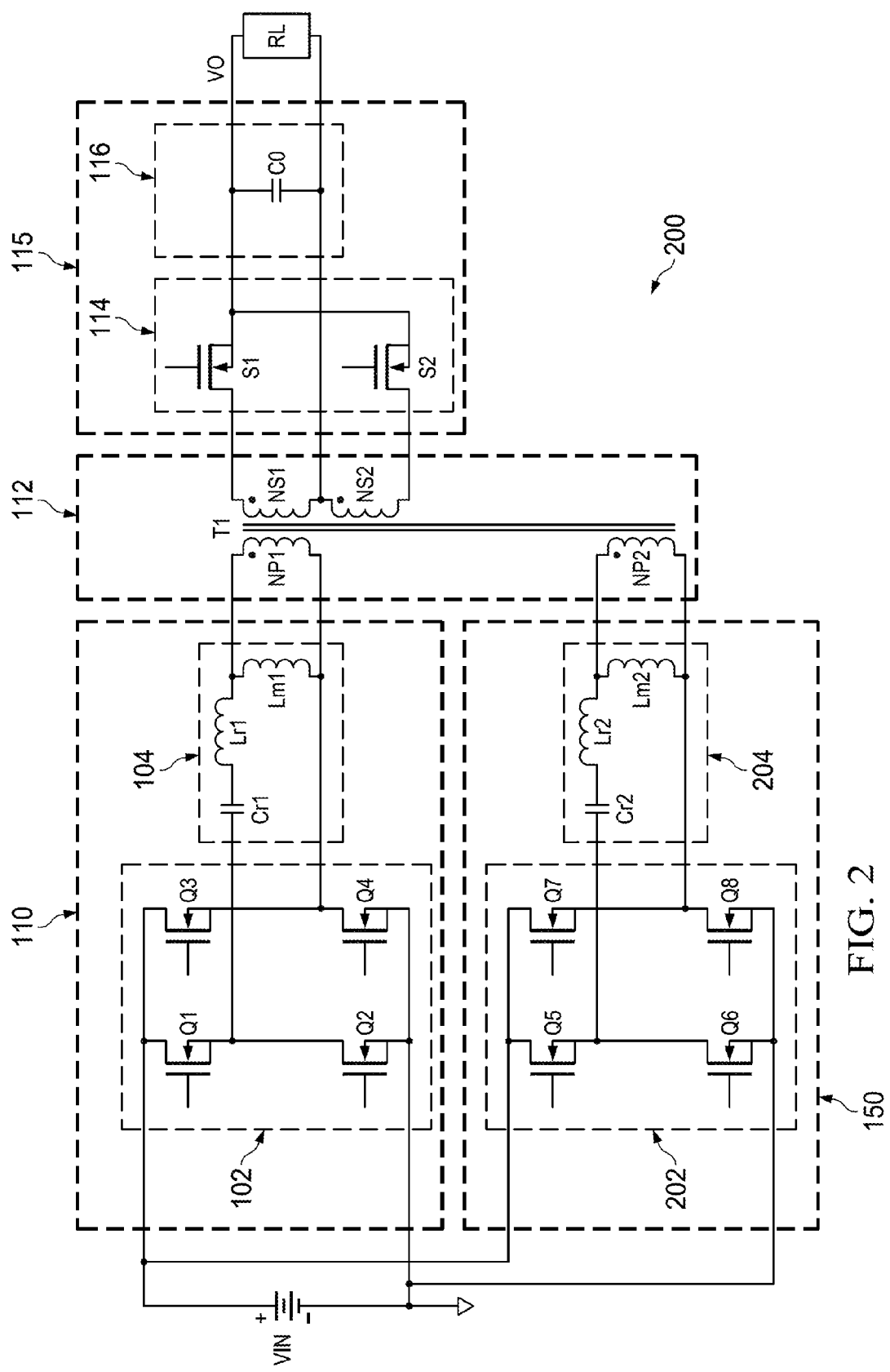
FIG. 2 illustrates a simplified schematic diagram of a dual primary bridge LLC resonant converter in accordance with various embodiments of the present disclosure.

In some embodiments, each power input stage (e.g., the first power input stage 110) of the power converter 100 may be a primary side circuit of an LLC resonant converter (not shown but illustrated in FIG. 2). Alternatively, the power input stage of the power converter 100 may be a primary side circuit of a three-element resonant converter topology such as an inductor-capacitor-inductor (LCL) resonant converter and/or the like. Furthermore, the power input stage of the power converter 100 may be a primary side circuit of a two-element resonant converter topology such as an inductor-capacitor (LC) resonant converter and/or the like. Furthermore, the power input stage of the power converter 100 may be a primary side circuit of a higher order resonant converter topology such as an LCLC resonant converter, an LCLCL resonant converter and/or the like.

In some embodiments, the first power input stage 110, the transformer 112 and the power output stage 115 form a first LLC resonant converter with a first Q value. Likewise, the second power input stage 150, the transformer 112 and the power output stage 115 form a second LLC resonant converter with a second Q value. The first LLC resonant converter and the second LLC resonant converter are connected in parallel. When both LLC resonant converters are enabled, the load current is evenly split between the first power input stage 110 and the second power input stage 150.

In accordance with the operating principle of LLC resonant converters, an LLC resonant converter comprises a resonant tank formed by a resonant inductor Lr, a resonant capacitor Cr and a magnetizing inductance Lm. The load of the LLC resonant converter is defined as RL. The Q value of an LLC resonant converter is given by the following equation:

$$Q = \frac{\sqrt{L_r/C_r}}{RL} \quad (1)$$

Depending on different applications and design needs, the first Q value may be equal to the second Q value. Alternatively, the first Q value may be greater than the second Q value. During a startup process of the power converter 100, the first power input stage 110 may be enabled and the second power input stage 150 may be disabled. The second power input stage 150 remains disabled until the output voltage of the power converter 100 is greater than a first predetermined threshold. In some embodiments, the first predetermined threshold is about 90% of the steady-state output voltage of the power converter 100.

The higher Q value of the first power input stage 110 helps to reduce the inrush current of the power converter 100 during the startup process. In some embodiments, under an operating condition, the inrush current of a single bridge LLC resonant converter (not shown) has a peak inrush current equal to 344 A. In contrast, under the same operating condition, the inrush current of a dual power input stage resonant converter (e.g., power converter 100) has a peak inrush current equal to 104 A. The detailed schematic diagram of the dual power input stage resonant converter will be described below with respect to FIG. 3.

Furthermore, when the power converter 100 operates at a light load condition, one input power stage such as the second power input stage 150 may be disabled so as to improve the efficiency of the power converter 100. On the other hand, when the power converter 100 operates at a full load condition or a heavy load condition, both the first power input stage 110 and the second power input stage 150 are activated so that the first power input stage 110 and the second power input stage 150 are connected in parallel. The parallel-connected input stages help to reduce the equivalent Q of the power converter 100. Such a reduced Q value helps to improve the efficiency of the power converter 100.

In operation, a control circuit (not shown) may detect the load current of the power converter 100. In response to a load increase or a transition from light load to full load, the control circuit enables the second power input stage 150. On the other hand, in response to a load drop or a transition from full load to light load, the control circuit disables the second power input stage 150. A predetermined current threshold may be used to determine whether the power converter 100 operates in a light load condition. In some embodiments, the predetermined current threshold is about 10% of the full load of the power converter 100.

One advantageous feature of having a dual primary bridge resonant converter shown in FIG. 1 is that two primary bridges may be of two different Q values. During a startup process, only the primary bridge with a higher Q value is activated. Such a higher Q value helps to reduce the inrush current of the power converter 100.

Another advantageous feature of having a dual input stage resonant converter shown in FIG. 1 is that, during a full load condition, both input stages are activated so that the full load may be evenly distributed between the two input stages. Such a uniform distribution of the output power between the two input stages helps to reduce the voltage and current stresses in each input stage. On the other hand, during a light load condition, only one input stage may be activated. As a result, the power losses (e.g., gate drive losses) from the other input stage may be saved.

It should be noted while FIG. 1 only illustrates two input power stages, a person skilled in the art will recognize there may be many alternatives, variations and modifications. For example, depending on different applications and design needs, additional input power stages may be employed to further improve the efficiency (e.g., the light load efficiency) of the power converter 100.

FIG. 2 illustrates a simplified schematic diagram of a dual primary bridge LLC resonant converter in accordance with various embodiments of the present disclosure. The dual primary bridge LLC resonant converter 200 is coupled between an input dc power source VIN and a load.

The input dc power source VIN may be telecommunication power supplies converting a utility line voltage to a dc voltage. Alternatively, the input dc power source VIN may be a solar panel array. Furthermore, the input dc power source VIN may be an energy storage device such as rechargeable batteries, fuel cells and/or the like. The load represents the power consumed by a circuit coupled to the dual primary bridge LLC resonant converter 200. Alternatively, the load may refer to downstream converters coupled to the output of the dual primary bridge LLC resonant converter 200.

The dual primary bridge LLC resonant converter 200 may comprise two input power stages, namely a first power input stage 110 and a second power input stage 150. As shown in FIG. 2, the first power input stage 110 comprises a first full bridge switching network 102 and a first resonant tank 104. Likewise, the second power input stage 150 comprises a second full bridge switching network 202 and a second resonant tank 204.

The first full bridge switching network 102 is formed by switches Q1, Q2, Q3 and Q4. The first resonant tank 104 is formed by Cr1, Lr1 and Lm1. The second full bridge switching network 202 is formed by switches Q5, Q6, Q7 and Q8. The second resonant tank 204 is formed by Cr2, Lr2 and Lm2.

As shown in FIG. 2, the first power input stage 110 and the second power input stage 150 are coupled to a first primary side winding NP1 and a second primary side winding NP2 respectively. In addition, the first power input stage 110 and the second power input stage 150 are of the same power structure. For simplicity, only the structure and operating principle of the first power input stage 110 are described in detail below.

The first full bridge switching network 102 includes four switching elements. As shown in FIG. 2, a first pair of switching elements Q1 and Q2 are connected in series. A second pair of switching elements Q3 and Q4 are connected in series. The common node of the switching elements Q1 and Q2 is coupled to a first input terminal of the first resonant tank 104. Likewise, the common node of the switching elements Q3 and Q4 is coupled to a second input terminal of the first resonant tank 104.

As shown in FIG. 2, the switching elements Q1, Q2, Q3 and Q4 may form a primary side switching network of a full bridge converter. According to some embodiments, switching elements Q1, Q2, Q3 and Q4 are implemented as MOSFET or MOSFETs connected in parallel.

According to alternative embodiments, the switching elements (e.g., switch Q1) may be an insulated gate bipolar transistor (IGBT) device. Alternatively, the switching elements can be any controllable switches such as integrated gate commutated thyristor (IGCT) devices, gate turn-off thyristor (GTO) devices, silicon controlled rectifier (SCR) devices, junction gate field-effect transistor (JFET) devices, MOS controlled thyristor (MCT) devices, gallium nitride (GaN) based power devices and/or the like.

It should be noted that while the first full bridge switching network 102 shown in FIG. 2 includes the primary side switches of a full bridge resonant converter according to some embodiments. Alternatively, the first full bridge switching network 102 may be of the primary side switches of other bridge converters such as a half-bridge resonant converter, a push-pull resonant converter, any combinations thereof and the like.

It should further be noted that while FIG. 2 illustrates four switching elements Q1, Q2, Q3, and Q4, various embodiments of the present disclosure may include other variations, modifications and alternatives. For example, a separate capacitor (not shown) may be connected in parallel with each switching element (e.g., switch Q1) of the first full bridge switching network 102. Such a separate capacitor helps to better control the timing of the resonant process of the dual primary bridge LLC resonant converter 200.

FIG. 2 shows that the first resonant tank 104 is formed by a first resonant inductor Lr1, a first resonant capacitor Cr1 and a first magnetizing inductance Lm1 of the transformer 112. As shown in FIG. 2, the first resonant inductor Lr1 and the first resonant capacitor Cr1 are connected in series and further coupled between a first terminal of the primary side of the transformer 112 and a common node of the switching elements Q1 and Q2.

As shown in FIG. 2, the inductor connected in parallel with the first primary side winding NP1 of the transformer 112 may be implemented as a magnetizing inductance of the transformer 112. Alternatively, the resonant inductor Lm1 may be implemented as external inductors.

The configuration of the first resonant tank 104 described above is merely an example. There may be many variation, alternatives and modifications. For example, the first resonant inductor Lr1 may be implemented as a leakage inductance of the transformer 112. In addition, the inductor connected in parallel with the first primary side winding NP1 of the transformer 112 may be implemented as a separate inductor connected in parallel with the first primary side winding NP1 of the transformer 112.

As shown in FIG. 2, the transformer 112 comprises the first primary side winding NP1, the second primary side winding NP2, a first secondary side winding NS1 and a second secondary side winding NS2. The first primary side winding NP1 is coupled to the first power input stage 110 and the second primary side winding NP2 is coupled to the second power input stage 150 as shown in FIG. 2. The secondary side windings NS1 and NS2 are coupled to the load through the rectifier 114 and the output filter 116.

It should be noted that the transformers illustrated herein and throughout the description are merely examples, which should not unduly limit the scope of the claims. One of ordinary skill in the art would recognize many variations, alternatives, and modifications. For example, the transformer 112 may further comprise a variety of bias windings and gate drive auxiliary windings.

It should further be noted the transformer structure shown in FIG. 2 is merely an example. One person skilled in the art will recognize many alternatives, variations and modification. For example, the transformer 112 may be a non-center tapped transformer coupled between the dual primary bridges and the rectifier 114. The secondary side of the transformer 112 may employ a full-wave rectifier formed by four switching elements. The operation principle of a rectifier coupled to a center tapped transformer secondary side is well known, and hence is not discussed in further detail herein.

It should be noted that the power topology of the dual primary bridge LLC resonant converter 200 may be not only applied to a rectifier as shown in FIG. 2, but also applied to other secondary configurations, such as voltage doubler rectifiers, current doubler rectifiers, any combinations thereof and/or the like.

The power output stage 115 comprises the rectifier 114 and the output filter 116. The rectifier 114 and the output filter 116 are connected in cascade and further coupled to the load as shown in FIG. 2.

The rectifier 114 converts an alternating polarity waveform received from the output of the transformer 112 to a single polarity waveform. When the transformer 112 is of a center tapped secondary, the rectifier 114 may be formed of a pair of switching elements such as n-type metal oxide semiconductor (NMOS) transistors. Alternatively, the rectifier 114 may be formed of a pair of diodes. On the other hand, when the transformer is of a single secondary side winding, the rectifier 114 may be a full-wave rectifier coupled to the single secondary side winding of the transformer 112.

Furthermore, the rectifier 114 may be formed by other types of controllable devices such as metal oxide semiconductor field effect transistor (MOSFET) devices, bipolar junction transistor (BJT) devices, super junction transistor (SJT) devices, insulated gate bipolar transistor (IGBT) devices, gallium nitride (GaN) based power devices and/or the like. The detailed operation and structure of the rectifier 114 are well known in the art, and hence are not discussed herein.

The output filter 116 is used to attenuate the switching ripple of the dual primary bridge LLC resonant converter 200. According to the operation principles of isolated dc/dc converters, the output filter 116 may be an L-C filter formed by an inductor and a plurality of capacitors. One person skilled in the art will recognize that some isolated dc/dc converter topologies such as forward converters may require an L-C filter.

On the other hand, some isolated dc/dc converter topologies such as LLC resonant converters may include an output filter formed by a capacitor or a plurality of capacitors connected in parallel. One person skilled in the art will further recognize that different output filter configurations apply to different power converter topologies as appropriate. The configuration variations of the output filter 116 are within various embodiments of the present disclosure.

Figure 3:
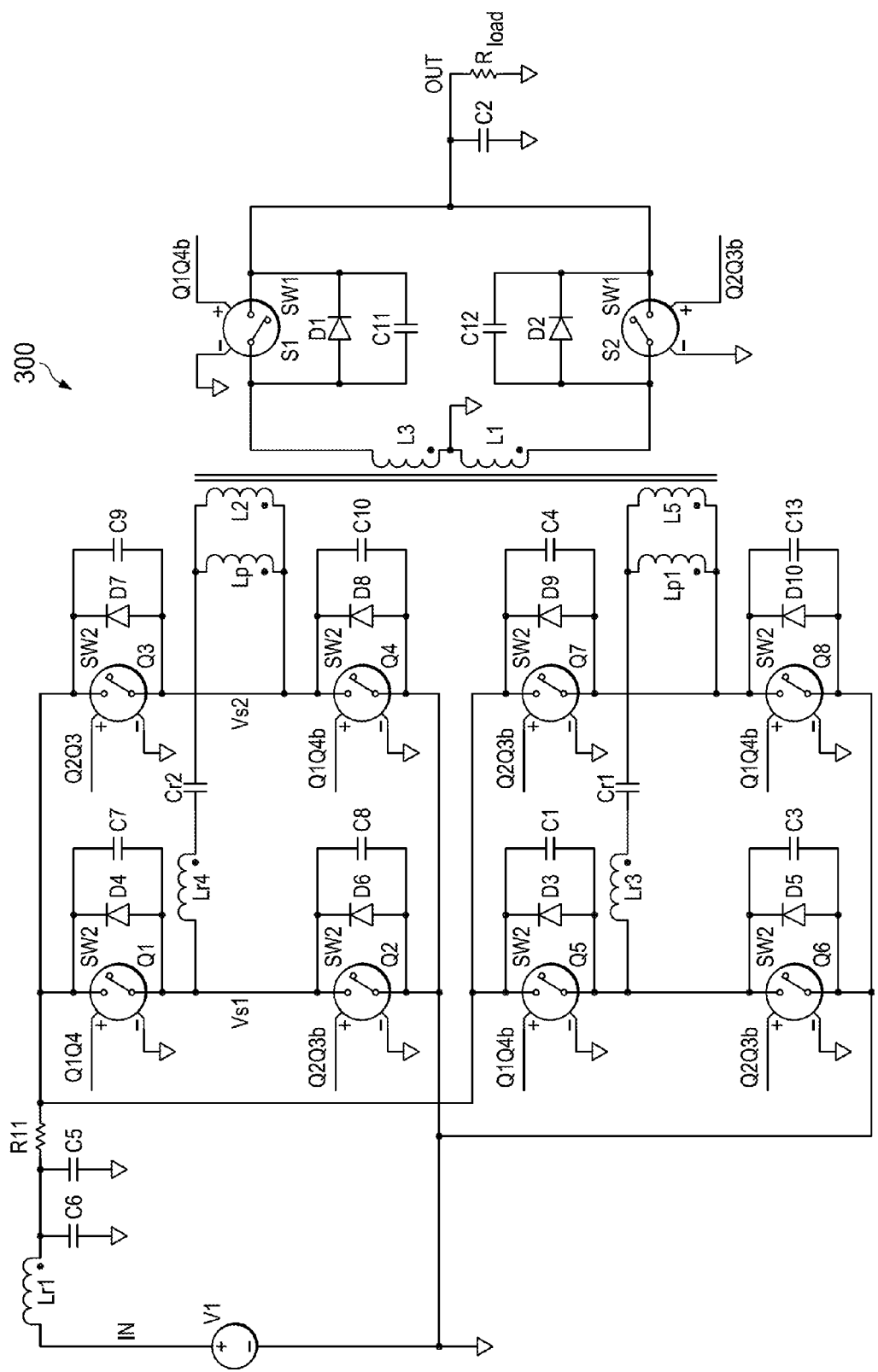
FIG. 3 illustrates a schematic diagram of a dual primary bridge LLC resonant converter in accordance with various embodiments of the present disclosure.

FIG. 3 illustrates a schematic diagram of a dual primary bridge LLC resonant converter in accordance with various embodiments of the present disclosure. The structure and operating principle of the power converter 300 are similar to that of the dual primary bridge LLC resonant converter 200 shown in FIG. 2, and hence is not discussed herein to avoid unnecessary repetition.

As shown in FIG. 3, a first resonant tank may comprise Cr2 and Lr4. A second resonant tank may comprise Cr1 and Lr3. In some embodiments, Cr2 is three times greater than Cr1. Lr3 is three times greater than Lr4. Apply equation (1) above to the first resonant tank and the second resonant tank respectively. The Q value of the first resonant tank is three times greater than the Q value of the second resonant tank.

It should be noted that the values given in FIG. 3 are selected purely for demonstration purposes and are not intended to limit the various embodiments of the present invention to any particular values. A person skilled in the art will recognize that, depending on different application and design needs, the resistance, inductance and capacitance shown in FIG. 3 may be changed to different values.

Figure 4:
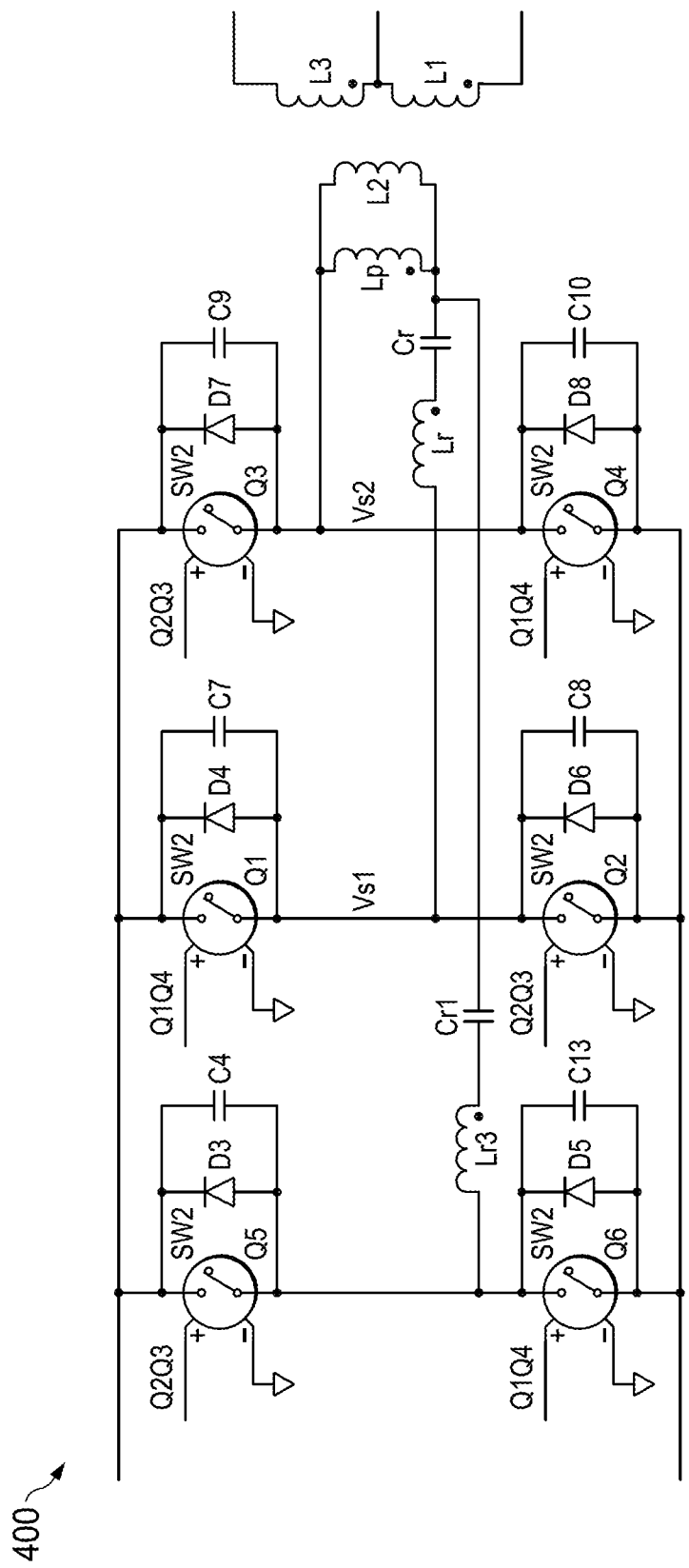
FIG. 4 illustrates a schematic diagram of another implementation of the power converter shown in FIG. 1 in accordance with various embodiments of the present disclosure.

FIG. 4 illustrates a schematic diagram of another implementation of the power converter shown in FIG. 1 in accordance with various embodiments of the present disclosure. The power converter 400 shown in FIG. 4 is similar to the power converter 300 shown in FIG. 3 except that two primary side windings are replaced by a single primary side winding. In addition, two primary bridges shown in FIG. 3 are replaced by a single bridge having six switching elements.

As shown in FIG. 4, the single bridge comprises three legs. The left leg and the middle leg form a first LLC resonant converter. The resonant tank of the first LLC resonant converter comprises Lr3, Cr1. The right leg and the middle leg form a second LLC resonant converter. The resonant tank of the second LLC resonant converter comprises Lr and Cr. As shown in FIG. 4, the middle leg is shared by the first LLC resonant converter and the second LLC resonant converter. In fact, the power converter 400 is a simplified variation of the power converter 300 shown in FIG. 3.

Figure 5:
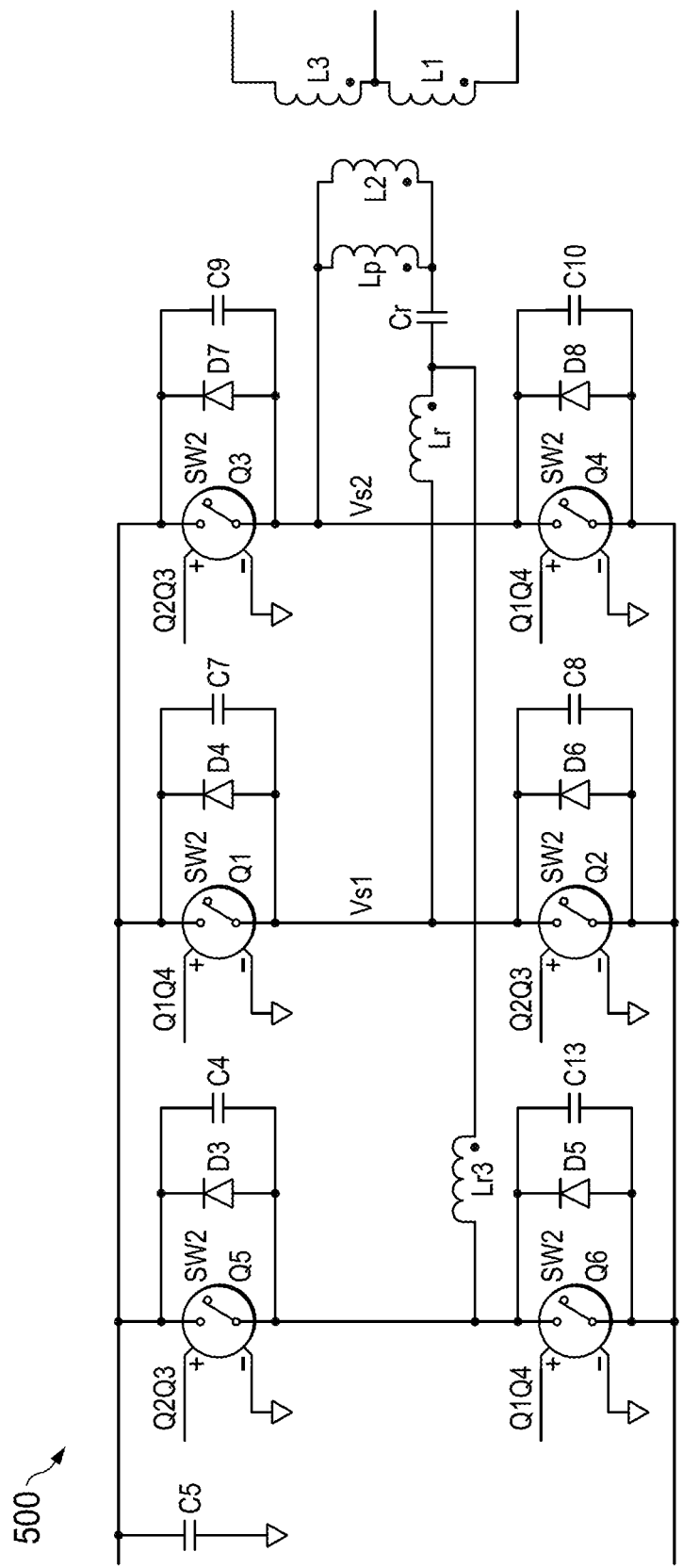
FIG. 5 illustrates a schematic diagram of yet another implementation of the power converter shown in FIG. 1 in accordance with various embodiments of the present disclosure.

FIG. 5 illustrates a schematic diagram of yet another implementation of the power converter shown in FIG. 1 in accordance with various embodiments of the present disclosure. The power converter 500 shown in FIG. 5 is similar to the power converter 400 shown in FIG. 4 except that the resonant capacitor Cr is shared by two LLC resonant converters.

Figure 6:
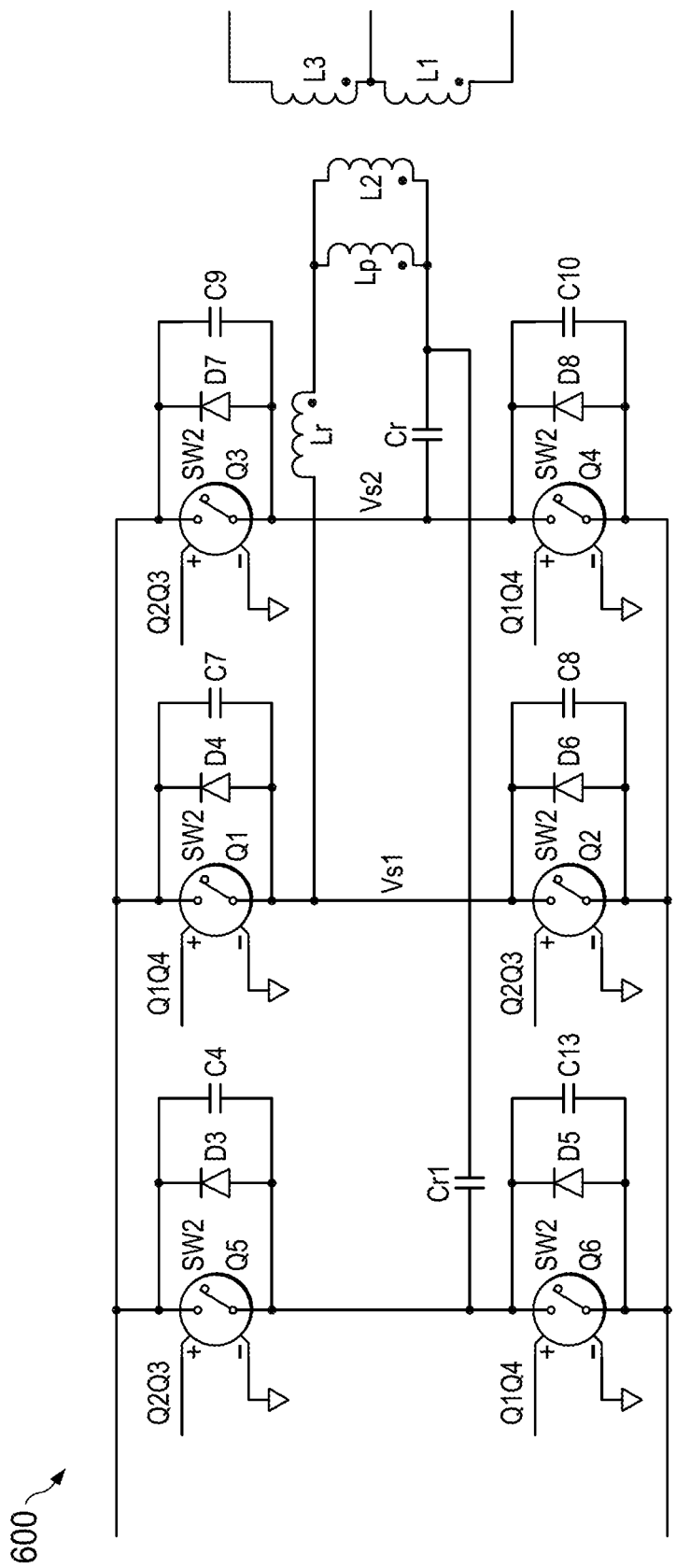
FIG. 6 illustrates a schematic diagram of yet another implementation of the power converter shown in FIG. 1 in accordance with various embodiments of the present disclosure.

FIG. 6 illustrates a schematic diagram of yet another implementation of the power converter shown in FIG. 1 in accordance with various embodiments of the present disclosure. The power converter 600 shown in FIG. 6 is similar to the power converter 400 shown in FIG. 4 except that the resonant inductor Lr is shared by two LLC resonant converters. As shown in FIG. 6, a common node of Cr and Cr1 is connected to the primary side of the transformer.

Although embodiments of the present invention and its advantages have been described in detail, it should be understood that various changes, substitutions and alterations can be made herein without departing from the spirit and scope of the invention as defined by the appended claims.

Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed, that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:
1. A converter comprising:
an input stage coupled to a power source, wherein the input stage comprises a plurality of power switches;
a first resonant tank coupled to the plurality of power switches, wherein the first resonant tank is of a first Q value;
a second resonant tank coupled to the plurality of power switches, wherein the second resonant tank is of a second Q value, and wherein the first Q value is greater than the second Q value, and wherein the first resonant tank is configured to be enabled and the second resonant tank is configured to be disabled during a startup process;
a transformer coupled to the input stage; and
an output stage coupled to the transformer.

2. The converter of claim 1, wherein:
the input stage comprises a first full bridge switching network and a second full bridge switching network, and wherein:
the first full bridge switching network and the second full bridge switching network are connected in parallel and coupled between the power source and the transformer; and
the first full bridge switching network is coupled to a first primary side winding of the transformer and the second full bridge switching network is coupled to a second primary side winding of the transformer.

3. The converter of claim 2, wherein:
the first resonant tank comprises a first inductor and a first capacitor, and wherein the first inductor and the first capacitor are connected in series and coupled between the first full bridge switching network and the first primary side winding of the transformer; and
the second resonant tank comprises a second inductor and a second capacitor, and wherein the second inductor and the second capacitor are connected in series and coupled between the second full bridge switching network and the second primary side winding of the transformer.

4. The converter of claim 1, wherein the input stage comprises:
a first switch and a second switch connected in series and coupled between two terminals of the power source;
a third switch and a fourth switch connected in series and coupled between the two terminals of the power source; and
a fifth switch and a sixth switch connected in series and coupled between the two terminals of the power source.

5. The converter of claim 4, wherein:
the first resonant tank comprises a first inductor and a first capacitor, and wherein the first inductor and the first capacitor are connected in series and coupled between a first terminal of a primary side winding of the transformer and a common node of the first switch and the second switch;
the second resonant tank comprises a second inductor and a second capacitor, and wherein the second inductor and the second capacitor are connected in series and coupled between the first terminal of the primary side winding of the transformer and a common node of the fifth switch and the sixth switch; and
a second terminal of the primary side winding of the transformer is coupled to a common node of the third switch and the fourth switch.

6. The converter of claim 4, wherein:
the first resonant tank comprises a first inductor and a first capacitor; and
the second resonant tank comprises a second inductor and the first capacitor, and wherein:
the first inductor has a first terminal coupled to a common node of the first switch and the second switch;
the second inductor has a first terminal coupled to a common node of the fifth switch and the sixth switch and a second terminal coupled to a second terminal of the first inductor; and
a primary side winding of the transformer and the first capacitor are connected in series and coupled between a common node of the first inductor and the second inductor, and a common node of the third switch and the fourth switch.

7. The converter of claim 4, wherein:
the first resonant tank comprises a first inductor and a first capacitor; and
the second resonant tank comprises the first inductor and a second capacitor, and wherein:
the first capacitor has a first terminal coupled to a common node of the first switch and the second switch;
the second capacitor has a first terminal coupled to a common node of the fifth switch and the sixth switch, and a second terminal coupled to a second terminal of the first capacitor; and
a primary side winding of the transformer and the first inductor are connected in series and coupled between a common node of the first capacitor and the second capacitor, and a common node of the third switch and the fourth switch.

8. The converter of claim 1, wherein:
the first Q value is in a range from about 0.2 to about 5; and
the second Q value is in a range from about 0.2 to about 5.

9. A method comprising:
providing a resonant converter, wherein the resonant converter comprises:
an input stage coupled to a power source, wherein the input stage comprises a plurality of power switches;
a first resonant tank coupled to a first portion of the plurality of power switches, wherein the first resonant tank is of a first Q value;
a second resonant tank coupled to a second portion of the plurality of power switches, wherein the second resonant tank is of a second Q value;
a transformer coupled to the first resonant tank and the second resonant tank; and
an output stage coupled to the transformer;
enabling the first portion of the plurality of power switches and disabling the second portion of the plurality of power switches during a startup process of the resonant converter; and
enabling the second portion of the plurality of power switches after an output voltage of the resonant converter is greater than a first predetermined threshold and a load current of the resonant converter is greater than a second predetermined threshold.

10. The method of claim 9, wherein:
the first portion of the plurality of power switches and the first resonant tank form a first resonant converter having the first Q value; and
the second portion of the plurality of power switches and the second resonant tank form a second resonant converter having the second Q value, and wherein the first Q value is greater than the second Q value.

11. The method of claim 9, further comprising:
detecting the load current of the resonant converter; and
disabling the second portion of the plurality of power switches when load current is less than the second predetermined threshold.

12. The method of claim 9, further comprising:
in response to a load increase, enabling the second portion of the plurality of power switches; and
in response to a load drop, disabling the second portion of the plurality of power switches.

13. The method of claim 9, wherein:
the first portion of the plurality of power switches is a first full bridge switching network; and
the second portion of the plurality of power switches is a second full bridge switching network, and wherein:
the first full bridge switching network and the second full bridge switching network are connected in parallel and coupled between the power source and the transformer.

14. The method of claim 9, wherein:
the first predetermined threshold is about 90% of a steady-state output voltage of the resonant converter; and
the second predetermined threshold is about 10% of a full load current of the resonant converter.

15. A method comprising:
providing a dual primary bridge resonant converter, wherein the dual primary bridge resonant converter comprises:
a first full bridge switching network; and
a first resonant tank coupled to the first full bridge switching network, wherein the first resonant tank is of a first Q value;
a second full bridge switching network, wherein the second full bridge switching network and the first full bridge switching network are connected in parallel; and
a second resonant tank coupled to the second full bridge switching network, wherein the second resonant tank is of a second Q value;
a transformer coupled to the first resonant tank and the second resonant tank; and
an output stage coupled to the transformer; and
enabling the first full bridge switching network and disabling the second full bridge switching network during a startup process of the dual primary bridge resonant converter.

16. The method of claim 15, further comprising:
enabling the second full bridge switching network after an output voltage of the dual primary bridge resonant converter is greater than a first predetermined threshold.

17. The method of claim 15, further comprising:
enabling the second full bridge switching network when a load current of the dual primary bridge resonant converter is greater than a second predetermined threshold.

18. The method of claim 15, further comprising:
in response to a load increase, enabling the second full bridge switching network; and
in response to a load drop, disabling the second full bridge switching network.

19. The method of claim 15, wherein:
the first Q value is greater than the second Q value.

20. The method of claim 15, wherein:
the first full bridge switching network and the first resonant tank form a first LLC resonant converter; and
the second full bridge switching network and the second resonant tank form a second LLC resonant converter, wherein the first LLC resonant converter and the second LLC resonant converter are connected in parallel.

* * * * *